United States Patent
Harada et al.

(10) Patent No.: US 9,864,114 B2
(45) Date of Patent: Jan. 9, 2018

(54) ZONE PLATE HAVING ANNULAR OR SPIRAL SHAPE AND Y-SHAPED BRANCHING EDGE DISLOCATION

(75) Inventors: Ken Harada, Tokyo (JP); Teruo Kohashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 342 days.

(21) Appl. No.: 14/240,393

(22) PCT Filed: Sep. 28, 2011

(86) PCT No.: PCT/JP2011/005443
§ 371 (c)(1),
(2), (4) Date: Feb. 22, 2014

(87) PCT Pub. No.: WO2013/046257
PCT Pub. Date: Apr. 4, 2013

(65) Prior Publication Data
US 2014/0204463 A1 Jul. 24, 2014

(51) Int. Cl.
*G02B 5/18* (2006.01)
*G21K 1/06* (2006.01)
(Continued)

(52) U.S. Cl.
CPC ............. *G02B 5/1876* (2013.01); *G21K 1/06* (2013.01); *G02B 27/42* (2013.01);
(Continued)

(58) Field of Classification Search
None
See application file for complete search history.

(56) References Cited

U.S. PATENT DOCUMENTS 7,227,618 B1 * 6/2007 Bi .................. G03F 7/70275
355/67
8,922,895 B1 * 12/2014 Weber ................ G02B 5/045
359/625
(Continued)

FOREIGN PATENT DOCUMENTS

WO     WO 2011136759 A1 * 11/2011 ......... G01N 21/6456

OTHER PUBLICATIONS

Allen, L., et al., "Orbital angular momentum of light and the transformation of Laguerre-Gaussian laser modes", Physical Review A, vol. 45-No. 11, Jun. 1, 1992, pp. 8185-8189, The American Physical Society.
(Continued)

*Primary Examiner* — Stephone B Allen
*Assistant Examiner* — Ryan S Dunning
(74) *Attorney, Agent, or Firm* — Miles & Stockbridge P.C.

(57) ABSTRACT

Although, conventionally, there were two methods, (1) a wave was transmitted through a spiral phase plate and (2) a diffraction grating containing an edge dislocation was used, they incurred complication of a configuration and securement of a larger amount of space and were not efficient because each of the spiral wave generation methods needed an incident wave to be a plane wave and at least one time of imaging is necessary at the time of wave irradiation on an observation object. In order to efficiently generate the spiral wave having a sufficient intensity, a structure of edge dislocation is taken in into a pattern of the zone plate and a spiral pattern containing a discontinuous zone is formed. Moreover, a thickness and a quality of material that change the phase of the wave by an odd multiple of $\pi$ are selected for a material of the wave-blocking section in the pattern.

7 Claims, 21 Drawing Sheets

(51) Int. Cl.
G02B 27/44 (2006.01)
G02B 27/42 (2006.01)

(52) U.S. Cl.
CPC ...... *G02B 27/4233* (2013.01); *G02B 27/4266* (2013.01); *G02B 27/44* (2013.01)

(56) References Cited

U.S. PATENT DOCUMENTS

| | | | |
|---|---|---|---|
| 2009/0153967 A1* | 6/2009 | Kotacka | G02B 5/1842 359/566 |
| 2010/0134869 A1* | 6/2010 | Bernet | G02B 5/001 359/290 |
| 2013/0032734 A1* | 2/2013 | Santori | G01N 21/6456 250/458.1 |
| 2014/0253781 A1* | 9/2014 | Gill | G02B 5/1842 348/335 |
| 2015/0160381 A1* | 6/2015 | Weber | G02B 5/09 359/742 |

OTHER PUBLICATIONS

Osakabe,.N., et al., "Observation of Surface Undulation Due to Single-Atomic Shear of a Dislocation by Reflection-Electron Holography", Physical Review Letters, vol. 62-No. 25, Jun. 19, 1989, pp. 2969-2972, The American Physical Society.
Uchida, M., et al., "Generation of electron beams carrying orbital angular momentum", Nature, vol. 464, Apr. 1, 2010, pp. 737-739, Macmillan Publishers Limited.
Verbeeck, J., et al., "Production and application of electron vortex beams", Nature, vol. 467, Sep. 16, 2010, pp. 301-304, Macmillan Publishers Limited.

* cited by examiner (a)

(b)

(c)

(a)

(b)

(c)

(a)

(b)

(c)

(a)

(b)

(c)

(a)

(b)

(c)

(a)

(b)

(c)

(a)

(b)

(c)

(a)  95

(b)  95

(a)

(b)

(c)

ZONE PLATE HAVING ANNULAR OR SPIRAL SHAPE AND Y-SHAPED BRANCHING EDGE DISLOCATION

TECHNICAL FIELD

The present invention relates to an optical element used in order to generate a spiral wave and its pattern.

BACKGROUND ART

<Zone Plate>

A zone plate is an optical element called an annular zone plate of Fresnel, and is an optical element having a function of converging or diverging a wave using a diffraction phenomenon. As shown in FIG. 1 (a), when a point light source of wavelength λ is placed at a point Q away from the screen by a distance f on an optical axis 2, denoting a distance from an intersection O of the screen 5 and the optical axis 2 by r(x, y), the zone plate has a structure that divides the screen so that the distance from the point Q to the screen may become f+λ/2, f+λ, f+3λ/2, . . . f+mλ/2, i.e., a structure that is comprised of concentric annular zones whose center is the intersection O of the screen 5 and the optical axis 2 and that are different in width.

Generally, the zone plate that makes a light wave impossible to pass through the annular zones by blocking an odd-numbered annular zone to an adjacent eve-numbered annular zone when counting the degree n from the smaller side is called a positive zone plate, and the zone plate whose the even-numbered annular zone to the odd-number annular zone are blocked is called a negative zone plate. FIG. 1 (b) and FIG. 1 (c) show the positive and negative zone plates, respectively.

If the screen 5 of FIG. 1 (a) is replaced with a plane wave, the zone plate can be described as an interference fringe of the plane wave and a spherical wave. Formula 1 and Formula 2 express a plane wave $\Phi_p$ and a spherical wave $\Phi_s$ that propagate on the optical axis 2, respectively. However, it is assumed that both the plane wave and the spherical wave have an amplitude of 1 and theirs distributions are uniform. Handling about the amplitude is the same also in following formulae unless it is specified otherwise especially.

$$\Phi_p(x, y) = \exp\left[\frac{2\pi i}{\lambda}\eta\lambda\right] \qquad \text{[Formula 1]}$$

$$\Phi_s(x, y) = \exp\left[\frac{2\pi i}{\lambda}\frac{r(x, y)^2}{f}\right] \qquad \text{[Formula 2]}$$

Here, η contained in the phase term of the plane wave is a phase value at the point O where observation is performed, and corresponds to an initial phase when forming an interference fringe. In this application, this will be called an initial phase of an annular zone grating that forms the zone plate, or is simply called an initial phase of the zone plate.

Moreover, an intensity distribution I(x, y) of the interference fringe that the above-mentioned plane wave $\Phi_p$ and spherical wave $\Phi_s$ make is expressed by Formula 3.

$$I(x, y) = \frac{1}{2} + \frac{1}{2}\cos\left[\frac{2\pi}{\lambda}\left(\frac{r(x, y)^2}{f} - \frac{3\lambda}{4}\right)\right] \qquad \text{[Formula 3]}$$

Here, the distribution is expressed by setting the phase value of the plane wave to η=¾ in order to match the distribution to the positive zone plate and is expressed by normalizing the distribution so that a maximum value of the intensity may become 1. A value η=¾ of the initial phase of this plane wave is a condition that a diameter of a circular opening in a central part of the positive zone plate becomes a maximum. Moreover, the diameter has become just the same amount as that of the Zernike's phase plate, and this indicates a part of an effect as the phase plate of the zone plate.

When Formula 3 is binarized, the zone plate where an area of 0≤I<0.5 is made black (blocking) and an area of 0.5≤I<1 is made white (transmission) is the positive zone plate (FIG. 1 (c)); conversely, the zone plate where an area of 0≤I<0.5 is made white (transmission) and an area of 0.5≤I<1 is made black (blocking) is the negative zone plate (FIG. 1 (c)).

FIG. 2 (a) shows the intensity distribution I(x, y) based on Formula 3. In the central part of the figure, i.e., a portion of the center of the annular zone, there is a portion whose intensity is slightly weak, and this is an effect of the phase value η=¾ of the plane wave. FIG. 2 (b) shows an intensity distribution of the interference fringe at the time of η=0. Although at this time, the intensity becomes strongest in the central part, diameters of the circular opening in the central part (innermost annular zone) and respective annular zones have become small. That is, phases of the annular zones of which the zone plate is comprised change.

However, since a geometrical optical spatial relationship shown in FIG. 1 (a) does not changed at all with only a relative phase of the spherical wave and the plane wave that come to interfere with each other changed, the converging action and imaging action as the zone plate do not change between the both zone plates of FIGS. 2 (a), (b) in any way. FIG. 2 (c) shows the intensity distribution I(x, y) of the interference fringe at the time of η=½. Comparing this with FIG. 2 (b), the phase of the annular zone changes exactly by π or −π, and this distribution corresponds to the negative zone plate with respect to a condition of η=0.

Hereinafter, in this application, because of convenience of explanation, both a pattern that has an intensity distribution in the continuous half-tone as an interference fringe shown in FIG. 2 and a pattern that has a binarized intensity distribution as shown in FIG. 1 are called the zone plate unless it is specified otherwise especially. Further, if needed, the zone plate shall be differentiated by calling it the zone plate having the binarized intensity distribution. Moreover, although the above-mentioned description was explained taking the light wave as an example, such a relationship holds in a general wave of an X-ray, an electron ray, etc. and it is not limited to the light wave. This will be the same also in the following explanation.

<Imaging Action of Zone Plate>

Since the zone plate is described by interference of the spherical wave from the point light source and the plane wave, the zone plate may be considered as a hologram of the point light source. That is, the pattern expressed by Formula 3 has the imaging action like the hologram. Since it is the hologram, at the same time when a real image is formed, a virtual image (conjugate image) is also formed.

This can be briefly explained if the intensity distribution I(x, y) of the interference fringe of Formula 3 is redescribed as an amplitude transmissivity. An area where the intensity distribution is large is shown in Formula 4 as an area where the amplitude transmissivity $\Psi_r(x, y)$ is large. This means positive in the case of a film.

$$\Psi_t(x, y) = \frac{k_t}{2} + \frac{k_t}{2}\left[\exp\left[\frac{2\pi i}{\lambda}\left(\frac{r(x, y)^2}{f} - \frac{3\lambda}{4}\right)\right] + \exp\left[\frac{-2\pi i}{\lambda}\left(\frac{r(x, y)^2}{f} - \frac{3\lambda}{4}\right)\right]\right] \quad \text{[Formula 4]}$$

In order to make the following discussions intelligible, Formula 4 was expressed by using an exponential function, but if penetrability kt of the entire plate is uniform and can be assumed to be kt=1, the right hand side coincides with the intensity distribution of the interference fringe that is given by Formula 3 and is expressed with a cosine function. When the plane wave of wavelength $\lambda'$ and initial phase $\eta$ enters into the zone plate with the amplitude transmissivity expressed by Formula 4, the wave immediately after transmission of the zone plate is expressed by Formula 5.

$$\Phi_{re}(x, y) = \frac{1}{2}\exp\left[\frac{2\pi i}{\lambda'}\eta\lambda'\right] + \frac{1}{2}\left[\exp\left[\frac{2\pi i}{\lambda'}\left(\frac{r(x, y)^2}{\frac{\lambda}{\lambda'}f} - \left(\frac{3}{4} - \eta\right)\lambda'\right)\right] + \exp\left[\frac{-2\pi i}{\lambda'}\left(\frac{r(x, y)^2}{\frac{\lambda}{\lambda'}f} - \left(\frac{3}{4} - \eta\right)\lambda'\right)\right]\right] \quad \text{[Formula 5]}$$

Here, the first term of Formula 5 is a transmitted wave (zeroth-order diffracted wave), the second term is the spherical wave (primary diffracted wave) that diverges from the point light source, and the third term is the spherical wave (negative primary diffracted wave) that converges and forms a point image. This is nothing but a reproduction process of holography, and denoting a distance from the zone plate to the point image by f', f' just changes to f'=$\lambda/\lambda'$f and the initial phase just changes to $\frac{3}{4}-\eta$. The initial phase is a term that disappears by being cancelled out when the intensity distribution as an image is discussed, and the image formation distance f' contains a meaning of variation of magnification accompanying the change of wavelength.

Although a diffraction effect expressed by Formula 5 covers as large as the zeroth order term and ±first order terms at the most, when the effect is accompanied with higher order diffraction effects as in the case of a binarized zone plate, real images and virtual images by the higher order diffracted waves are also formed. However, one into which the intensity is concentrated most among the diffracted waves are ±first order diffracted waves, and their distances from the zone plate are expressed by Formula 6 as the principal focal distance f1.

$$f_1 = \frac{r_1^2}{\lambda'} \quad \text{[Formula 6]}$$

Here, r1 is a radius at which Formula 3 becomes ½ for the first time, namely, a radius r1=$\sqrt{(\lambda f)}$ of an innermost annular zone when binarization is done, and $\lambda'$ is a wavelength of the wave that irradiates the zone plate. When $\lambda'=\lambda$, f1 coincides with a distance f between the zone plate and the point light source.

Next, consider a case where the spherical wave $\Phi_s$ expressed by Formula 2 is entered into the zone plate with an amplitude transmissivity $\Psi_t$ expressed by Formula 4. Then, the wave immediately after its penetration of the zone plate is expressed by Formula 7. Here, because of simplicity, kt=1 is assumed and the same wavelength $\lambda$ as that at the time of interference fringe recording is used.

$$\Phi_{re}(x, y) = \frac{1}{2}\exp\left[\frac{2\pi i}{\lambda}\frac{r(x, y)^2}{f}\right] + \frac{1}{2}\left[\exp\left[\frac{2\pi i}{\lambda}\left(\frac{r(x, y)^2}{\frac{f}{2}} - \frac{3\lambda}{4}\right)\right] + \exp\left[\frac{2\pi i}{\lambda}\frac{3\lambda}{4}\right]\right] \quad \text{[Formula 7]}$$

A first term of Formula 7 expresses a transmitted wave (zeroth-order diffracted wave), a second term expresses the spherical wave whose focus distance is one half and whose degree of divergence is large (primary diffracted wave), and a third term expresses the plane wave (− primary diffracted wave). That is, the plane wave is reproduced even when the spherical wave is made to enter. This is one manifestation of the lens effect of the zone plate. The zone plate is capable of generating the spherical wave and the plane wave, respectively, when either of the spherical wave and the plane wave is made to enter.

<Brightness of Zone Plate>

Since the zone plate behaves as a lens, even when it is used in the optical system by specifying any area on the plate as the opening, it performs imaging performance as described above. However, since the interference phenomenon is used fundamentally, when the zone plate comes to a state where the innermost circular opening in the central part is blocked partially, it is known that a brightness of the image decreases rapidly.

This originates in that the opening area of the central part that contributes to the brightness most decreases in the positive zone plate and that an effect of mutually strengthening by an interference of the waves from the positions of symmetry across the center is lost. Therefore, when using the zone plate as a fast lens, it is necessary to consider not only a size of the opening of the optical system but also a fact that the center of the zone plate is included within the opening.

<Spiral Wave>

In a coherent optical system, a phase of the light wave that propagates is uniquely determined. A plane where its phase is equal is called a wave front, and from the shape of the wave front, classification of the wave fronts is carried out into the plane wave, the spherical wave, etc. This will be described in detail later using a formula. For example, a wave whose equiphase surface has a spiral shape centering on a certain axis (generally, parallel to the optical axis) shall be called the spiral wave in this application. FIG. 3 schematically shows a spiral wave 88 that is classified into the plane wave. In this wave, a singular point of the phase exists on a spiral axis, and it is impossible to define a phase on this axis.

This spiral wave is called a Laguerre-Gaussian beam or an optical spiral (optical vortex) in the optics, is the light wave propagating with an orbital angular momentum preserved, and can exert a force on the equiphase surface (wave front) perpendicularly thereto. Therefore, it becomes able to give momentum to an irradiation object, and is put in practical use, for example, as a manipulation technology such as an optical tweezer for operating particles about a size of a cell, and as laser processing and a super-resolution spectromicroscopy.

Furthermore, since multiple orbital angular momentums can be made to exist in a portion of the spiral axis that is a phase singularity point (as a topology charge, a strength of winding of the spiral can be selected), new technical deployments are expected in physical property analyses and structural analysises such as analyses of a magnetic state and a stereoscopic model of atomic arrangement in the fields of quantum communications and in the X-ray.

Also in the electron ray, in the 1970s when crystal observation by multiple-wave image formation has begun to be carried out, a discontinuous grating image was recorded in the high resolution image as an image of an edge dislocation in a crystal lattice, and existence of an electron wave having the spiral form was known. Moreover, in the reflection type electron ray holography, a phase image whose equiphase surface just forms the spiral shape was reproduced in a portion where the spiral dislocation reached to a surface (Nonpatent Literature 2). However, there is no case where an electron spiral wave is positively used as a probe.

After the spiral wave (Laguerre-Gaussian beam) attracted attention as a new probe in the field of the light wave (Nonpatent Literature 1), trials of generating the spiral waves positively have been performed also with electron rays. An electron ray is transmitted through a graphite membrane whose thickness varied spirally (Nonpatent Literature 3), a spectroscopic method using a diffraction grating containing an edge dislocation (forked diffraction grating) (Nonpatent Literature 4) has been tried, and formation of the electron spiral wave has been confirmed because a diffraction point has a ring-like intensity distribution.

In this spectroscopic method, an end part where the grating fringe is broken to become discontinuous is considered as an edge dislocation. It is possible to draw multiple grating fringes from one end part and, for example, in the case where two fringes are drawn, it is possible to generate the spiral wave whose phase varies by $4\pi$ (two wavelengths) when it goes around the spiral axis. This is called a secondary spiral and it is called a second-order edge dislocation. A spiral degree and an edge dislocation degree coincide with each other. Generation of a 25th-order spiral wave has been experimentally checked using a 25th-order edge dislocation.

Since the electron spiral wave makes the electron ray propagates with the orbital angular momentum preserved, it is expected that the electron spiral wave produces application fields as a probe of the electron ray that does not exist thus far. For example, they include sensitivity improvement and a three-dimensional state measurement in magnetization measurements, high-contrast and high-resolution observations of a protein molecule and a carbohydrate chain, etc.

Particularly, in magnetization observation, although the electron ray has a fundamentally fault that the electron ray does not have sensitivity to magnetization in parallel to its propagation direction, there is a possibility that the electron spiral wave can observe the magnetization in the propagation direction of the electron ray. Because of this reason, the electron spiral wave is beginning to be brought into the limelight as a probe of a next-generation electron ray apparatus.

CITATION LIST

Nonpatent Literature

Nonpatent Literature 1: L. Allen et al., Phys. Rev. A, 45 (1992) 8185.

Nonpatent Literature 2: N. Osakabe et al., Phys. Rev. Lett., 62 (1989) 2969.

Nonpatent Literature 3: M. Uchida and A. Tonomura, Nature, 464 (2010) 737.

Nonpatent Literature 4: J. Verbeeck et al., Nature, 467 (2010) 301.

SUMMARY OF INVENTION

Technical Problem

A spiral wave is a wave that propagates with an orbital angular momentum preserved, and can exert a force on the equiphase surface (wave front) vertically thereto. Therefore, since it becomes possible to give the momentum to an irradiation object, there are expected new technological deployments that do not exist hitherto not only application technologies of observation in the optics and electro-optics and processing but also in fields of quantum information commutations, etc. However, conventional techniques of generating the spiral wave were not efficient.

Conventionally, the methods used in order to create the spiral wave have the following two kinds:
(1) Transmit a wave though a spiral phase plate (Nonpatent Literature 3).
(2) Use a diffraction grating (forked diffraction grating) containing an edge dislocation (Nonpatent Literature 4).

First, the method of using a spiral phase plate (Nonpatent Literature 3) is a technique whereby a thickness of the phase plate or a quality of material thereof is varied spirally and the wave of a plane wave after passing through the phase plate is made to have a spiral-like phase distribution. Accuracies of uniformity of the phase plate, homogeneousness, and etc. are directly reflected on the accuracy of the spiral wave as they are. Therefore, it is extremely difficult to manufacture the phase plate for example, in the electron ray whose wavelength is shorter than an interatomic spacing by about two orders and where it is difficult to create an artificial structure that has a smooth thickness variation or a variation of the quality of material on a wavelength level. A reason that a graphite membrane whose thickness varied spirally was used in an experiment in an early stage with an electron ray existed in this situation.

Next, the method of using the diffraction grating containing the edge dislocation of (2) (forked diffraction grating) (Nonpatent Literature 4) is placed as an application of the holography technology, and is a method whereby the forked diffraction grating is irradiated with the plane wave and ±first-order or ±second-order diffracted waves in a reciprocal space (diffraction plane) of the transmitted wave are used as the spiral waves. In order to select the diffracted wave that becomes the spiral wave in the reciprocal space and return it to the plane wave, at least one time of image formation is needed. Therefore, a configuration that uses an optical element for changing back the spiral wave to the shape of the plane wave until it is irradiated on a sample becomes complicated, and further there arises a need to secure a space for installing the optical element for changing back to the shape of the plane wave.

From the above, generation of the spiral wave is not efficient in any method. Although there are several application examples in the optical field such as an optical tweezer, in the electron ray that has a large mutual interaction with a substance and a small penetrability and other rays, the application stays in a stage where only generation of the spiral wave is confirmed.

Solution to Problem

The zone plate in the present invention is the zone plate that has a function of converging or diverging a wave, and is characterized by having a discontinuity at least a part of which is discontinuous in a zone that is included in an annular zone grating of the above-mentioned zone plate, and in that the discontinuity forms an edge dislocation in the grating that the zone forms.

Moreover, the zone plate in the present invention is the zone plate that uses a diffraction phenomenon and converges or diverges a wave, and is characterized in that the zone plate is shaped with a spiral form defined by a shape combination of the annular zone grating and the diffraction grating containing the edge dislocation.

Advantageous Effects of Invention

By using the zone plate in the invention of this application, it is possible to vary the incident wave and control a shape of the spiral wave that is generated.

DESCRIPTION OF EMBODIMENTS

This application proposes the zone plate that has a new pattern shape (pattern shape of a spiral containing edge dislocation) as an optical element for generating a spiral wave, and is effective as an element for generating a spiral wave in an electron ray (electron wave), and also in a light wave, an X-ray, and other waves. Although explanations that illustrate the light wave or the electron ray (electron wave) will be large in number, this application is limited to neither the light wave nor the electron ray.

In defining a wave front to be perpendicular to the propagation direction of the wave, a property of the wave can be classified according to its wave front shape. In explaining the present invention, wave front shapes of a plane wave, a spherical wave, a conical surface wave, etc. will be first explained as the wave front shapes related to this application. Furthermore, two states of the wave front pertaining to this application, an inclination state and a spiral state, will be explained. Subsequently, embodiments will be described in order.

<Plane Wave>

Figure 4:
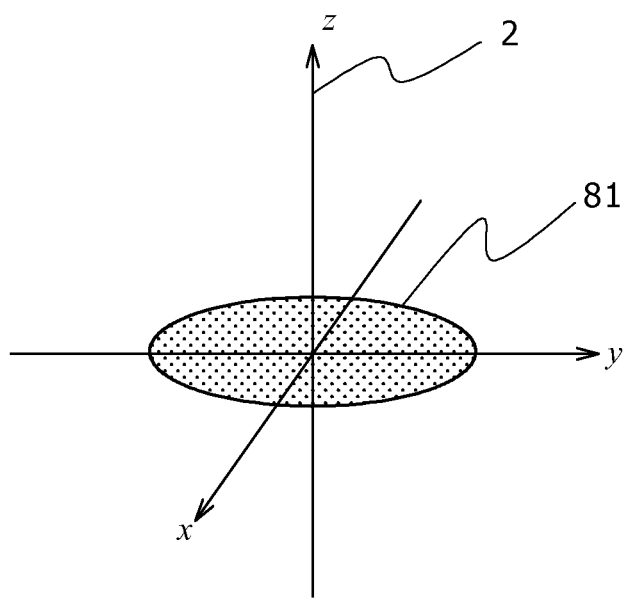
FIG. 4 is a schematic diagram for explaining a plane wave.

The plane wave is a wave such that its wave front shape as the equiphase surface forms a plane shape 81 vertical to the optical axis 2 (in the figure, a z-axis), as shown in FIG. 4. This becomes a distribution uniform in an xy plane. Since it is a wave uniform in the propagation direction, there is no attenuation in principle in the propagation, and the same wave is obtainable at any positions in the propagation direction. This is known as Kohler illumination, which is an illumination technique featuring a high parallelism. A formula of the wave is expressed by Formula 8.

$$\Phi_p(x, y) = \exp\left[\frac{2\pi i}{\lambda}\eta\lambda\right] \qquad \text{[Formula 8]}$$

Here, λ is a wavelength of the wave and η is a value of its phase. As described above, when this plane wave is superimposed on another wave to form an interference fringe, η corresponds to an initial phase of the interference fringe. Moreover, respects that its amplitude is assumed to be 1 and the distribution is assumed uniform are the same as those of what was previously described.

<Spherical Wave>

Figure 5:
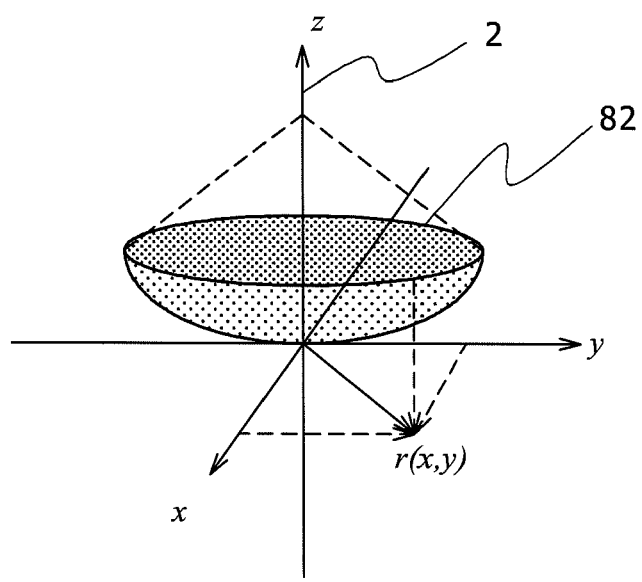
FIG. 5 is a schematic diagram for explaining a spherical wave.

The spherical wave has, as shown in FIG. 5, the wave front shape that forms a spherical surface 82. In FIG. 5, when it propagates to a negative direction of the z-axis, it is in a divergence state, and when it propagates to a positive direction of the z-axis, it is in a convergence state. Generally, a wave ejecting from a single point in space is the spherical wave. This is frequently used to illuminate only one point as critical illumination. A formula of the wave is expressed by Formula 9.

$$\Phi_s(x, y) = \exp\left[\frac{2\pi i}{\lambda} \frac{r(x, y)^2}{f}\right] \qquad \text{[Formula 9]}$$

Figure 1:
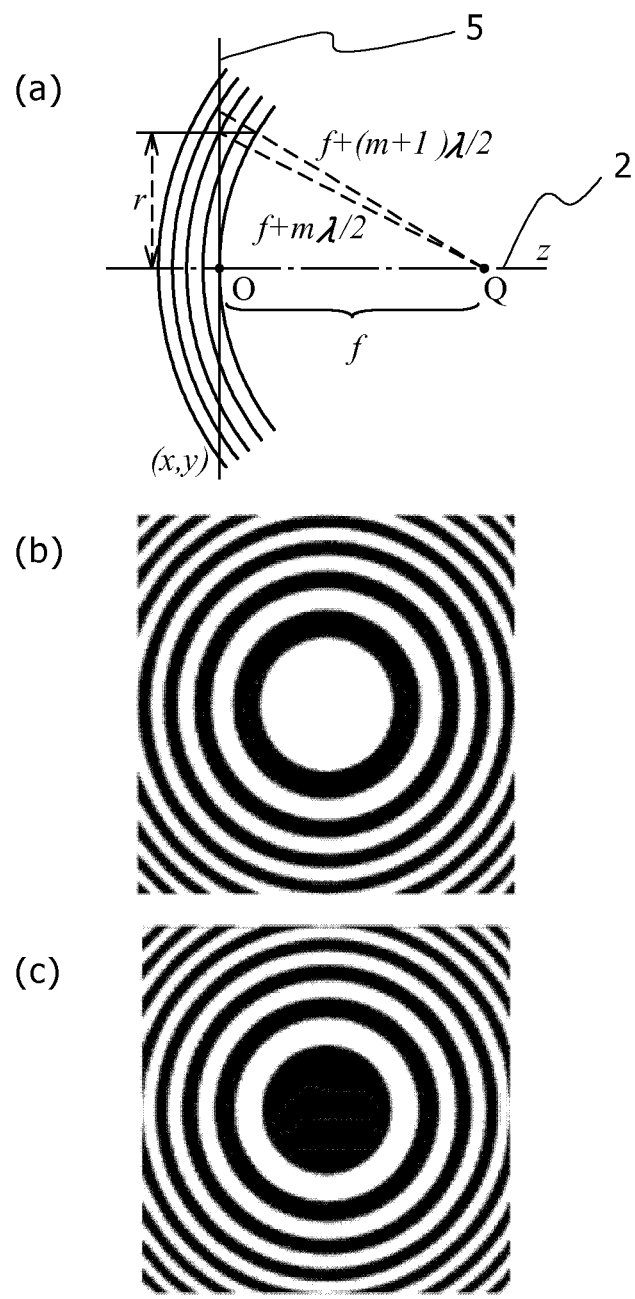
FIG. 1 illustrates schematic diagrams for explaining (a) a zone plate, (b) a positive zone plate (binarization), and (c) a negative zone plate (binarization).

Here, f is a distance on the optical axis between an observation plane of the wave and an ejection point (light source), and corresponds to a distance until which the spherical wave on the observation plane converges, i.e., a focal length (refer to FIG. 1 (a)). r(x, y) is a distance from the optical axis on the xy plane, and is expressed by $r(x, y)^2 = x^2 + y^2$.

<Conical Surface Wave>

Figure 6:
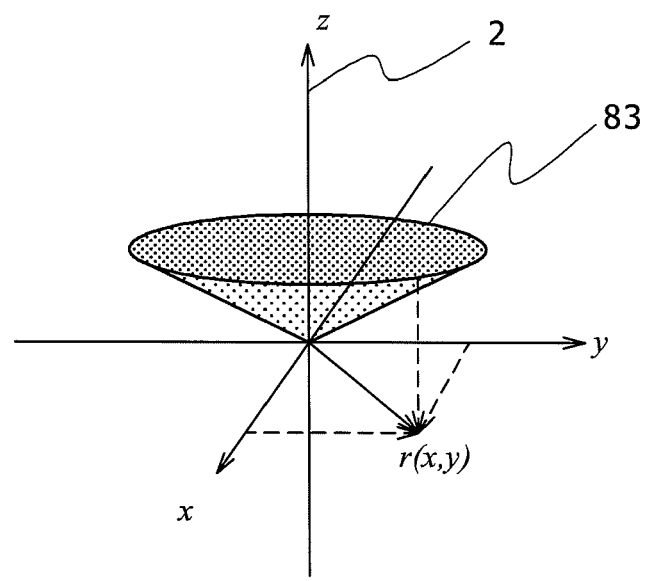
FIG. 6 is a schematic diagram for explaining a conical surface wave.

As shown in FIG. 6, the conical surface wave is a wave that does not have a convergence point like the spherical wave and has a phase distribution having a phase proportional to an off-axis distance r(x, y) centering on the optical axis. Since it has axial symmetry with respect to the optical axis, its wave front shape forms a conical surface shape 83. In the optics, the wave front shape after passing through an axicon lens coincides with this, and is put in practical use for focusing a laser beam and ring illumination.

In the case of the electron ray, it is difficult to create the conical surface wave with a usual electron lens that uses an electric field or a magnetic field, but it is possible to create it with an annular zone grating (refer to FIG. 7) with equal intervals as shown in this application. The conical surface wave can be considered as an aggregate of plane waves each having a uniform inclination state in all directions. A wave formula is expressed by Formula 10. Here, kc is a coefficient indicating acuteness of a point angle of a circular cone.

$$\Phi_c(x, y) = \exp\left[\frac{2\pi i}{\lambda} k_c r(x, y)\right] \qquad \text{[Formula 10]}$$

Figure 2:
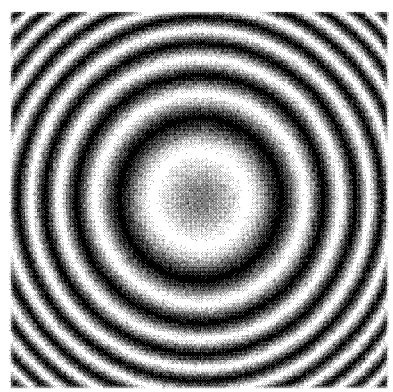
FIG. 2 illustrates pattern examples of the zone plate at the time of (a) initial phase=¾, (b) initial phase=0, and (c) initial phase=½.
Figure 2:
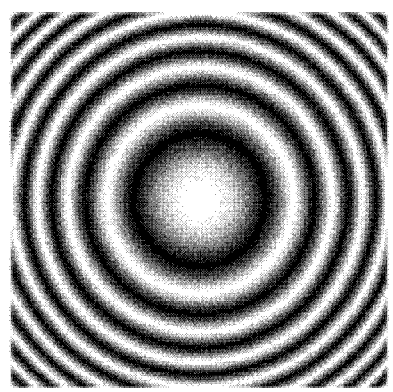
Figure 2:
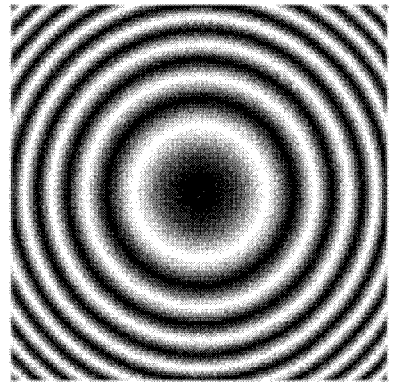
Figure 7:
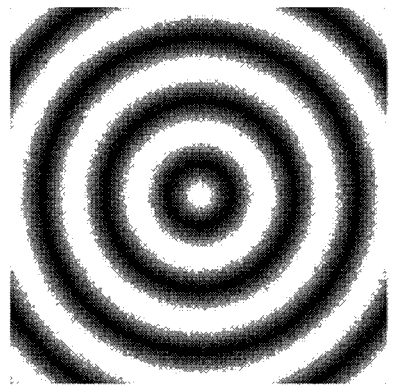
FIG. 7 illustrates pattern examples of an axicon lens type zone plate whose point angle is made acute at the time of (a) initial phase=0, (b) initial phase=½, and (c) the conical surface wave.
Figure 7:
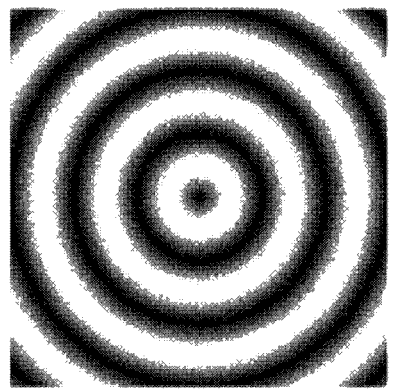
Figure 7:
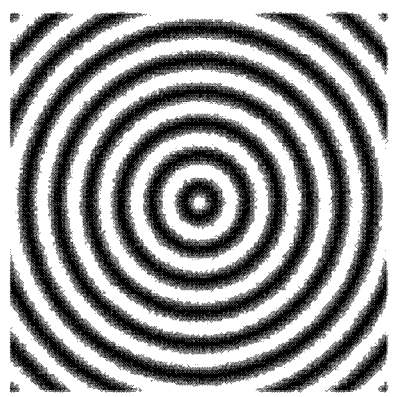

The zone plate that acts as the axicon lens shown in FIG. 7 is, like the usual zone plate shown in FIG. 1 or FIG. 2, also capable of varying the phase of a grating (compare and refer to FIGS. 7 (a) and (b)), and changing an interval of the grating (compare and refer to FIGS. 7 (a) and (c)). As will be clear if Formulae 9 and 10 are compared, they are different from each other only in a point that whether the off-axis distance from the optical axis on the xy plane r(x, y) is a quadratic function (spherical wave: however an approximate formula) or a linear function (conical surface wave).

<Inclination state>

Figure 8:
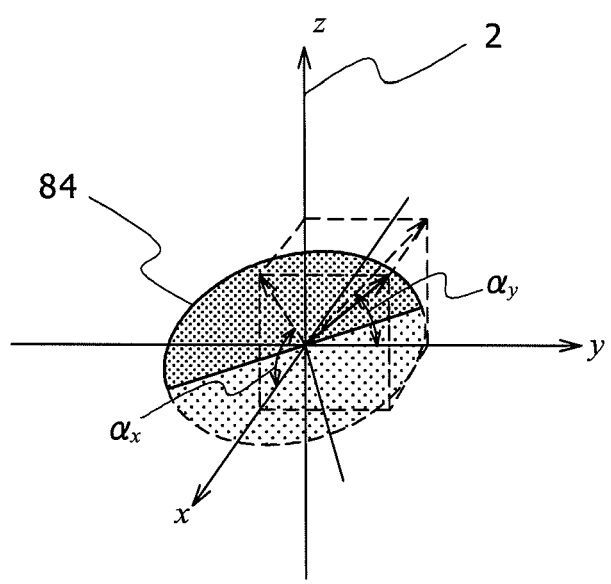
FIG. 8 is a schematic diagram for explaining the plane wave in an inclination state.

The inclination state is a state where the propagation direction of the wave inclines to the optical axis. FIG. 8 shows a plane wave 84 in the inclination state. When the wave front inclines in the x-axis direction by $\alpha_x$ and inclines in the y-axis direction by $\alpha_y$, the inclination state can be described independently regarding the x-axis and the y-axis, respectively. A phase term of the formula representing the wave is expressed by Formula 11 in this case. Here, $(\alpha_x, \alpha_y)=(0, 0)$ indicates a state without an inclination. That is, it expresses a wave that propagates on the optical axis.

$$\frac{2\pi i}{\lambda}(\alpha_x x + \alpha_y y) \qquad \text{[Formula 11]}$$

<Spiral State>

Figure 3:
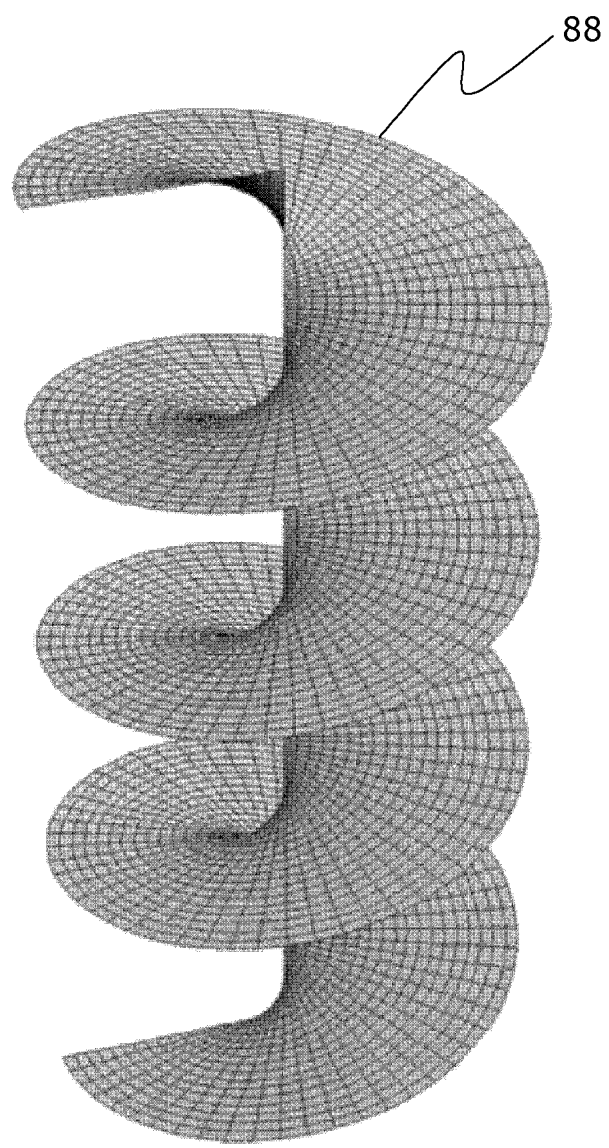
FIG. 3 is a schematic diagram showing a plane wave-like spiral wave that continues.
Figure 9:
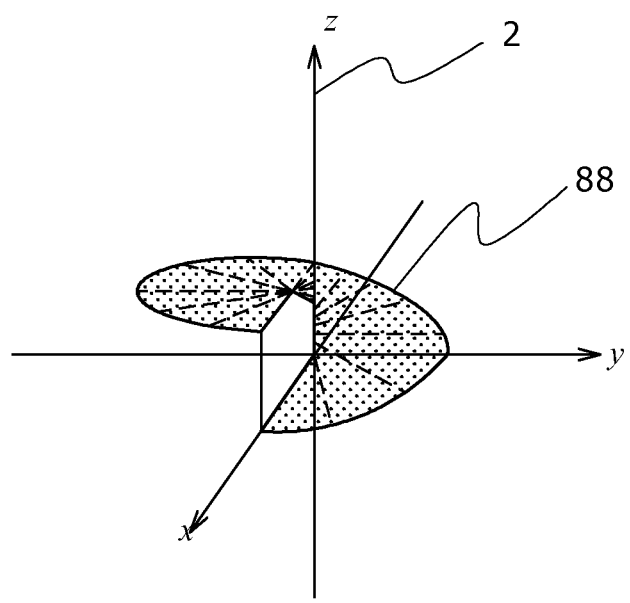
FIG. 9 is a schematic diagram showing a plane wave-like spiral state.

This means a state showing a wave of the spiral state that is an object of this application, and is a phase state where when the azimuth angle is made to go around by one rotation with an arbitrary one point $(x_1, y_1)$ set as a center (axis of the spiral), the phase changes by an integral multiple of $2\pi$. FIG. 9 shows an example that the plane wave forms the spiral state. FIG. 3 shows a situation of the wave front when this plane wave-like spiral wave 88 continues.

In this application, this integral multiple is expressed by nhm and shall be called the spiral degree (it is a quantum number of an orbital angular momentum and is known as a number of topological charges). $n_{hm}$ can take a negative value and a direction in which the spiral winds (whether it is in a clockwise winding or counterclockwise winding) depends on its positive and negative. This is expressed by Formula 12 as the phase term of the formula expressing a wave.

$$i\sum_m \left(n_{hm}\tan^{-1}\left[\frac{y - y_m}{x - x_m}\right] + \phi_m\right) \qquad \text{[Formula 12]}$$

Multiple spiral axes can be distributed on a plane, and can be deal with independently with respective coordinates on the xy plane set as $(x_m, y_m)$, respectively. For example, when the number of spiral axis is 1 and $(x_1, y_1)=(0, 0)$, the spiral is in a state where its spiral center is on the optical axis. $\Phi_m$ is a parameter that defines an initial azimuth angle when the spiral starts to wind, and represents an initial phase of edge dislocation in a pattern of the zone plate. Hereinafter, $\Phi_m$ is called a spiral phase.

The above-mentioned terms (Formulae 11, 12) are added to phase terms of respective wave formulae (Formulae 8, 9, and 10), describing respective states of the waves. For example, a formula of a wave that is the spherical wave and includes the spiral axis and whose propagation direction is inclined is represented as like Formula 13.

$$\Phi_s(x, y) = \exp i\left[\frac{2\pi}{\lambda}\left(\frac{r(x,y)^2}{f} + \alpha_x x + \alpha_y y\right) + \sum_m \left(n_{hm}\tan^{-1}\left[\frac{y - y_m}{x - x_m}\right] + \phi_m\right)\right] \qquad \text{[Formula 13]}$$

Figure 10:
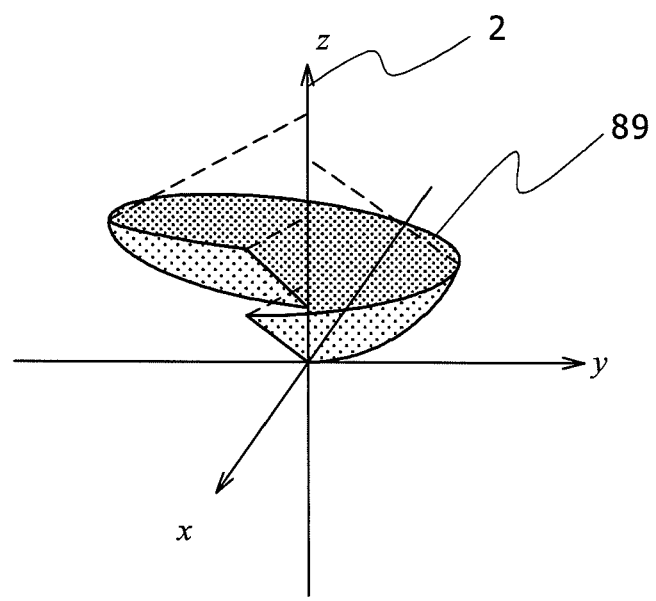
FIG. 10 is a schematic diagram showing a spherical wave-like spiral state.
Figure 11:
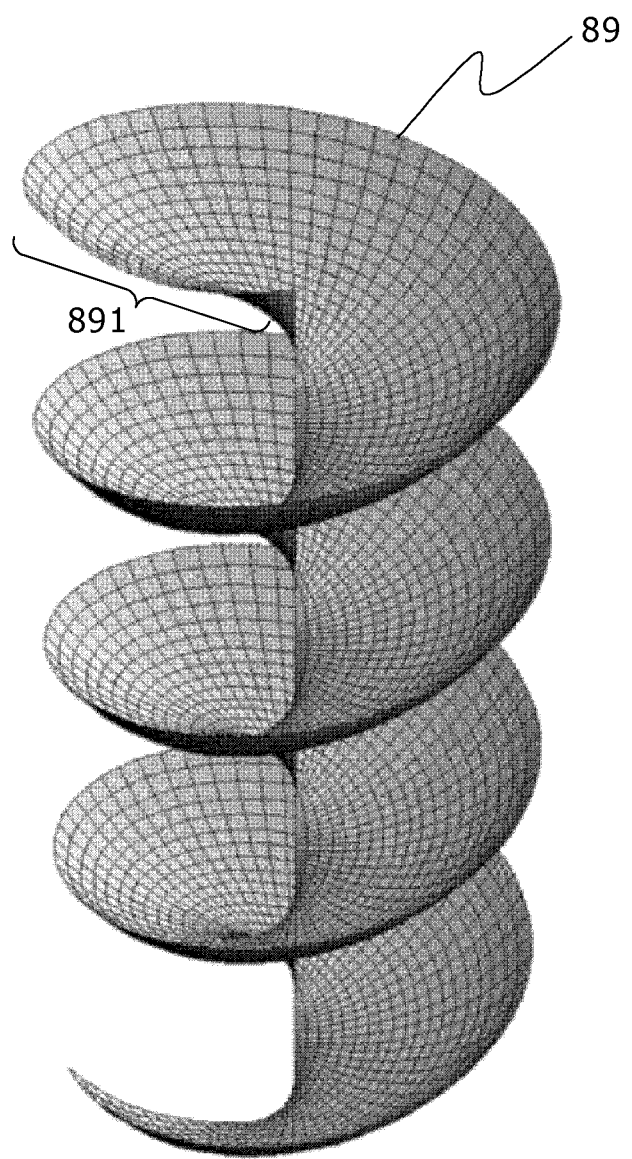
FIG. 11 is a schematic diagram showing a continuous spherical wave-like spiral wave.
Figure 12:
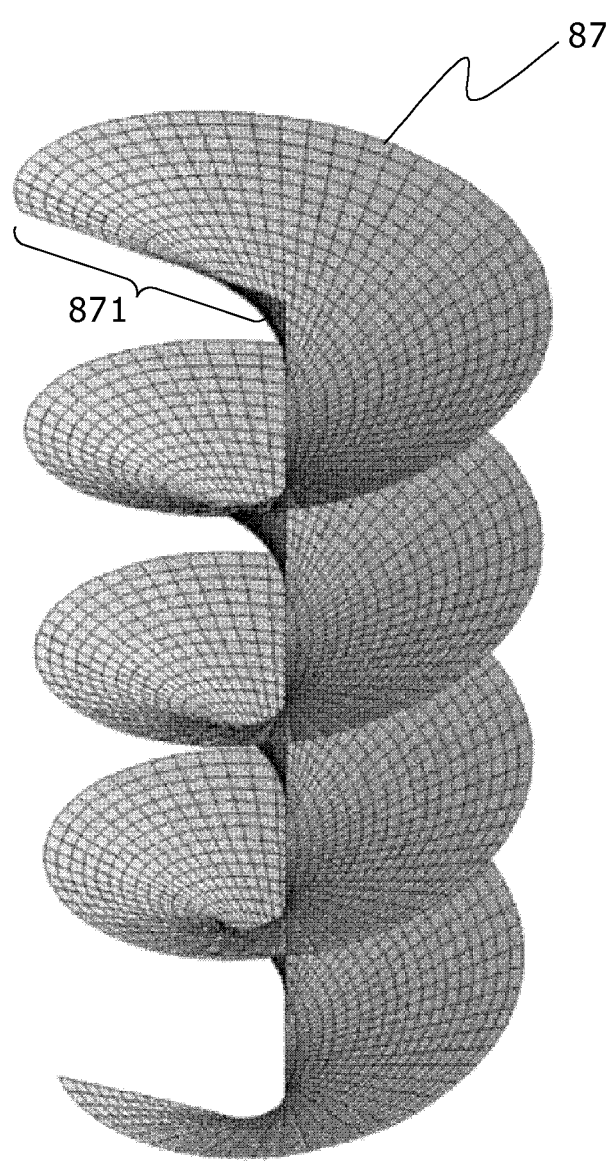
FIG. 12 is a schematic diagram showing a continuous conic wave-like spiral wave.

FIG. 10 shows a wave front 89 of the spherical wave in a state where a single spiral center exists on the optical axis. In addition, FIG. 11 shows a situation of the wave front when this spherical wave-like spiral wave continues. Moreover, FIG. 12 shows a situation of a continuous wave front 87 when the spiral state is added to the conical surface wave. Although this resembles the spherical wave-like spiral wave of FIG. 11, the both differ from each other in a point that whether a cross section of the wave front is a straight lie 871 (conical surface wave (FIG. 12)) or a circular arc 891 (spherical wave (FIG. 11)).

<Basic Expression of Spiral Zone Plate>

As shown by the above-mentioned Formulae 1 to 3, the zone plate can be expressed as an intensity distribution I(x, y) of the interference fringe that was made by interference between the spherical wave $\Phi_s$ that propagates on the optical axis and the plane wave $\Phi_p$. By making this include a general state including the inclination state and the spiral state, Formula 14 is obtained as an intensity distribution of a most general interference fringe.

$$I(x, y) = \frac{1}{2} + \frac{1}{2}\cos\left[\begin{array}{c}\frac{2\pi}{\lambda}\left(\frac{x^2+y^2}{f} + \alpha_x x + \alpha_y y\right) + \\ \eta + \sum_m \left(n_{hm}\tan^{-1}\left[\frac{y-y_m}{x-x_m}\right] + \phi_m\right)\end{array}\right] \quad \text{[Formula 14]}$$

The zone plate with an amplitude transmissivity distribution based on Formula 14 is a most fundamental zone plate for generating the spiral wave. This is a spiral pattern that contains an edge dislocation as a discontinuous fringe of a grating. The pattern of Formula 14 is clearly described in Formula 15 as the amplitude transmissivity distribution $\Psi$ in the case of using the wave of the same wavelength.

$$\Psi_h(x, y) = \frac{k_t}{2} + \frac{k_t}{2}\exp i\left[\begin{array}{c}\frac{2\pi}{\lambda}\left(\frac{x^2+y^2}{f} + \alpha_x x + \alpha_y y\right) + \\ \sum_m \left(n_{hm}\tan^{-1}\left[\frac{y-y_m}{x-x_m}\right] + \phi_m\right)\end{array}\eta +\right] + \quad \text{[Formula 15]}$$

$$\frac{k_t}{2}\exp -i\left[\begin{array}{c}\frac{2\pi}{\lambda}\left(\frac{x^2+y^2}{f} + \alpha_x x + \alpha_y y\right) + \\ \sum_m \left(n_{hm}\tan^{-1}\left[\frac{y-y_m}{x-x_m}\right] + \phi_m\right)\end{array}\eta +\right]$$

Like notations of the intensity distribution of the interference fringe of Formula 3 and the amplitude transmissivity distribution of Formula 4, if it can be assumed that penetrability kt of the entire plate is uniform and kt=1 holds, a relationship between Formula 14 and Formula 15 will have only a difference of notation systems. Hereinafter, in this application, the explanation will be given with a cosine function notation unless it is specified otherwise assuming that the intensity distribution and the amplitude transmissivity distribution are the same.

Moreover, an intensity distribution of a most general interference fringe in the case of the conical surface wave that includes the inclination state and the spiral state instead of the spherical wave is shown in Formula 16.

$$I(x, y) = \frac{1}{2} + \frac{1}{2}\cos\left[\begin{array}{c}\frac{2\pi}{\lambda}\left(k_c\sqrt{x^2+y^2} + \alpha_x x + \alpha_y y\right) + \\ \sum_m \left(n_{hm}\tan^{-1}\left[\frac{y-y_m}{x-x_m}\right] + \phi_m\right)\end{array}\eta +\right] \quad \text{[Formula 16]}$$

Formula 14 and Formula 16 have the same form except for the term related to Formula 9 of the spherical wave and the term related to Formula 10 of the conical surface wave being interchanged. That is, various discussions of the pattern of the zone plate by the spherical wave also holds, as they are, in the pattern of the zone plate by the conical surface wave.

In order for efficient generation of the spiral wave, the invention of this application takes in edge dislocation into a grating structure and forms the zone plate containing a discontinuous zone. Fundamentally, this becomes the zone plate having the spiral pattern. Moreover, there is naturally a case where the zone plate has a concentric shape not only in the spiral pattern but also in a portion where the spiral pattern is not formed. In other words, the spiral pattern is the structure that arises as a result of taking in the edge dislocation into the grating structure (annular zone grating). That is, the zone is the spiral shape that has at least one or more end part each for generating an edge dislocation, and when increasing or decreasing the azimuth angle seen from the spiral center, a distance between the zone and the spiral center varies continuously. Moreover, when the spiral center is regarded as an origin in polar coordinates, the zone has a thickness (equivalent to the thickness of the annular zone grating) in a distance direction in the polar coordinates.

At this time, by designing in advance positions and a number of the discontinuous zones (end part that makes the edge dislocation occur) and a degree of the edge dislocation in the zone plate according to a shape of the desired spiral wave and by irradiating it with a predetermined incident wave, a wave front of the spiral state is created in the diffracted wave after its penetration of the zone plate.

Moreover, in order to concentrate the diffracted waves after passing through the zone plate, regarding a material that forms the zone plate, its thickness and quality of the material so that the phase of the incident wave may be changed by predetermined amount (an odd multiple of a half wavelength, i.e., ±nπ (however, n being an odd number)) are selected.

Then, since this application can use a lens action that the zone plate has, the shape of a generated spiral wave is controllable by changing the wave that enters into the zone plate. That is, when entering the plane wave, the spherical wave-like spiral wave 89 (refer to FIG. 11, being describe later) can be generated, and when entering the spherical wave, the plane wave-like spiral wave 88 (refer to FIG. 3) can be generated. This selection can be done by an operator at the time of observation using the spiral wave or processing. Moreover, a burden on the optical system can be lessened by the lens action that the zone plate has.

Furthermore, since the pattern of the zone plate containing an edge dislocation essentially becomes a spiral pattern shape, it does not need the supporting substrate, a support rod, or the like for holding the wave-blocking section in space unlike the zone plate that is formed concentrically, and it becomes possible to hold only the blocking section in space as it is by rigidity of the material itself that forms the blocking section.

This makes it possible to transmit a wave passing through a transmission part through the zone plate without having any influence. This becomes a large advantage practically in the electron ray having a large interaction with the material that induces the supporting substrate or the support rod to produce an artifact, and the other rays.

Moreover, regarding the material that forms the zone plate, by selecting its thickness and its quality of material so that the phase of the incident wave may be changed by a predetermined quantity (odd multiple of the half wavelength), it becomes possible to concentrate the wave into the diffracted waves after its penetration of the zone plate and generate the spiral wave that has a sufficient intensity.

Hereinafter, spiral zone plates suitable for carrying out the present invention will be explained.

First Embodiment

Figure 13:
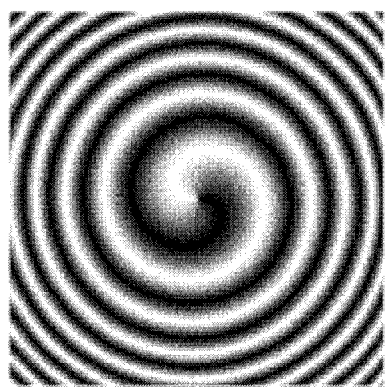
FIG. 13 illustrates pattern examples of spiral zone plates when (a) a spiral degree is 1, (b) the spiral degree is two, and (c) the spiral degree is three, respectively.
Figure 13:
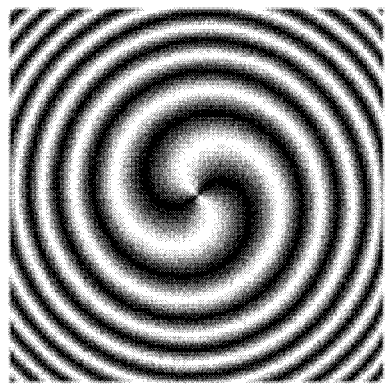
Figure 13:
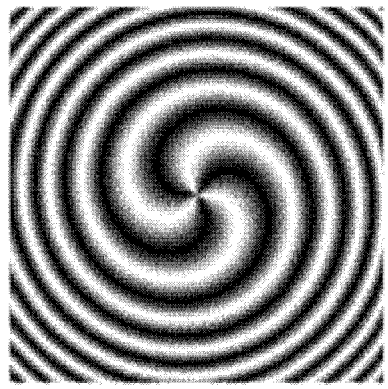

FIG. 13 is a pattern example of the zone plate for creating a wave front with one spiral axis. The zone plate is set up so that the axis of the spiral wave may be generated at the center of the zone plate, and the spiral center and the center of the zone plate coincide with each other. That is, the grating forms the spiral pattern as a result that a discontinuous point of the grating is located in the center of the zone plate and a nature of the spiral is reflected on the grating.

FIG. 13 (a) is a case of the spiral degree that is 1, FIG. 13 (b) is a case of the spiral degree that is two, and FIG. 13 (c) is a case of the spiral degree that is three. When the spiral degree is the second order or more, although the zone (grating fringe) of the zone plate makes a point contact in the central part of the spiral pattern, i.e., at a position of the edge dislocation, it is discontinuous as the grating even in this case.

The spiral patterns shown in FIGS. 13 (a), (b), and (c) correspond to cases where values of the parameter nhm each respresenting the spiral degree correspond to cases of 1, 2, and 3 among patterns of the interference fringes expressed by Formula 12 and Formula 14, respectively.

Although this is formed as a spiral zone (grating), when the distance from the center becomes larger, the width of the zone becomes thinner, and it performs a lens function equally with a normal zone plate. That is, the spiral zone plate shown in FIG. 13 performs the equivalent function as that of the normal zone plate regarding an effect and performance as the zone plate (performance that it makes the wave converge or diverge and forms an image as a lens) excluding a function of generating the spiral wave. Then, it has a new function of generating the spiral wave.

Even in the case of the spiral generated in the spiral shape zone plate of FIG. 13, as the spiral degree increases, a twist of the phase in the portion of the spiral axis becomes larger, and the sensitivity as the spiral wave becomes higher. That is, it is on a par with the conventional spiral wave also regarding a respect that sensitivity improvement and a three-dimensional state measurement in magnetic measurements, high-contrast and high-resolution observations of a protein molecule and a carbonate chain, etc. become possible to be performed in high sensitivity or in high efficiency, for example.

Second Embodiment

Figure 14:
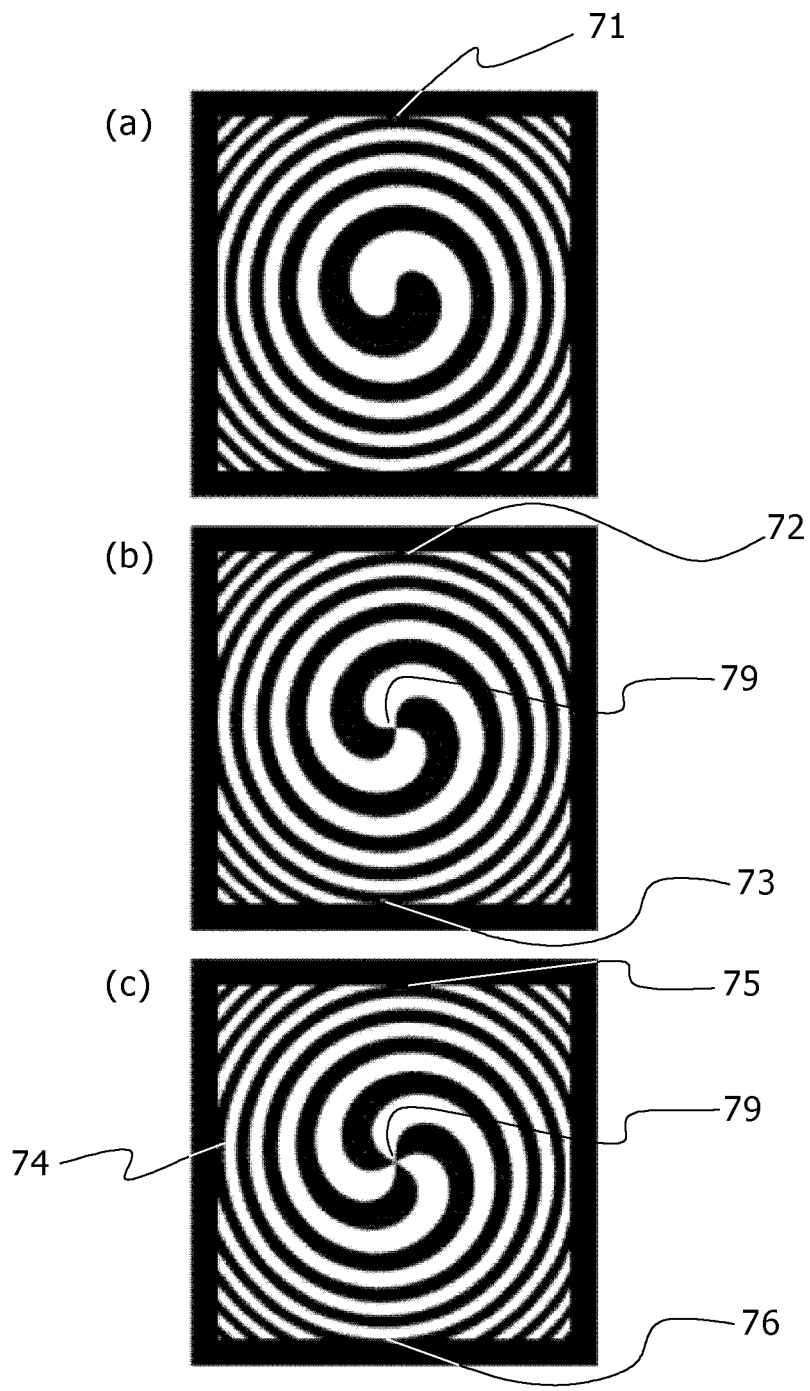
FIG. 14 illustrates pattern examples of spiral zone plates that are binarized when (a) the spiral degree is 1, (b) the spiral degree is two, and (c) the spiral degree is three, respectively.

FIG. 14 illustrates the zone plate when the spiral zone plate shown in FIG. 13 is binarized. Since the zone plate has the spiral pattern, the wave-blocking section is always connected to a periphery of the zone plate. In order to illustrate it, a circumference of the zone plate is enclosed with a black zone in FIG. 14 to indicate a connection with the wave-blocking section of the wave clearly.

That is, in the zone plate having the spiral pattern, the special supporting substrate, the support rod, or the like for holding a wave-blocking section in space is not needed, and it becomes possible to hold the blocking section, as it is, in space because of rigidity of the material itself that forms the blocking section. This is a large advantage practically in the electron ray having a large interaction with the material that induces the supporting substrate or the support rod to produce an artifact, and other rays.

FIG. 14 (a) is a case of a spiral degree of 1, FIG. 14 (b) is a case of a spiral degree of two, and FIG. 14 (c) is a case of a spiral degree of three. When the spiral degree is 1, a blocking section is with a cantilever type structure having one fulcrum (71). Although the number of discontinuous zones increase as the spiral degree increases in the central part of the spiral, since in a central part 79 of the spiral, the discontinuous zones can connect mutually, when the spiral degree is two, it becomes with a double-end supported type structure with two fulcrums (72, 73), and further when the spiral degree is three, it becomes with a structure with three fulcrums (74, 75, 76). This is effective in strengthening a mechanical strength of the blocking section structurally, and is convenient for holding only the blocking section, as it is, in space.

Furthermore, since the increase in the number of discontinuous zones leads to division of the length of the zone from the periphery of the zone plate to the discontinuity of the spiral center by that number, the length from fulcrums (71 to 76) to a spiral center 79 also becomes short; therefore, it can maintain a mechanical strength. Therefore, this is still better for holding only the blocking section in space, as it is. Incidentally, when the spiral degree is two or more, although contact of the blocking section in the central part of the spiral is point contact mathematically, it goes without saying that an actual configuration takes a structure having a finite dimension that does not lose imaging performance of the zone plate.

In the case of a binarized pattern of FIG. 14, by selecting a thickness of the material of the blocking section and its quality of the material suitably, it becomes possible to transmit the wave also though the blocking section and changes the phase of the wave by an odd multiple of $\pi$ or an odd multiple of $-\pi$. By selecting such an amount of phase modulation, concentration of the wave to a principal focus by the zone plate is accelerated. This will be explained in details in a seventh embodiment.

Concentration of the wave to the principal focus directly means an increase in the intensity of the obtained spiral wave, which makes it possible to perform, for example, sensitivity improvement and a three-dimensional state measurement in magnetization measurements and high-contrast and high-resolution observations of a protein molecule, a carbohydrate chain, etc.

Third Embodiment

Figure 15:
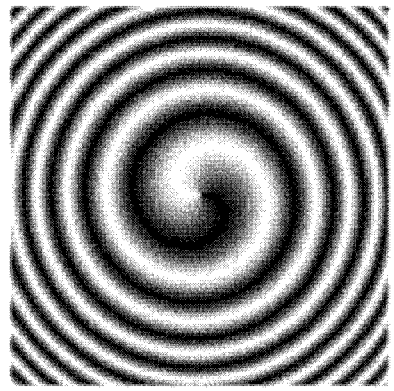
FIG. 15 illustrates pattern examples of spiral zone plates when (a) an initial phase of the spiral is zero, (b) an initial phase of the spiral is 2π/3, and (c) an initial phase of the spiral is 4π/3, respectively.
Figure 15:
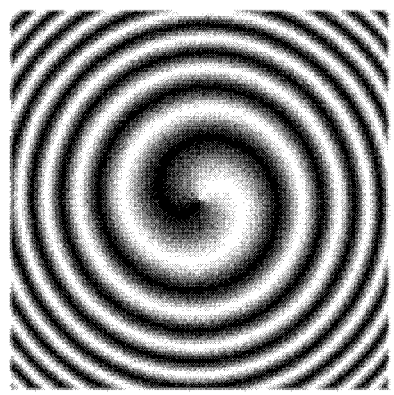
Figure 15:
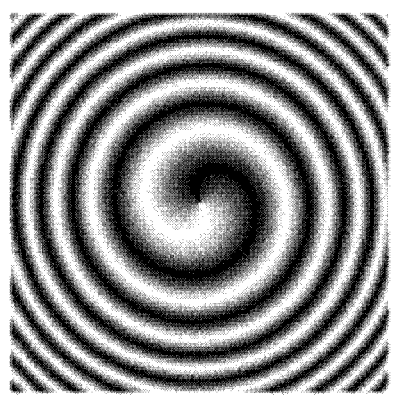

FIG. 15 shows an initial phase of the spiral wave that the spiral zone plate generates, in other words, a pattern of the zone when the initial phase of the edge dislocation is varied. Although FIG. 15 (a) coincides with FIG. 13 (a), the initial phase of the spiral wave is varied by $2\pi/3$ in FIG. 15 (b) and FIG. 15 (c), which is reflected on a start of wind of the spiral in a central part of the zone plate. If the zone plates as shown in FIG. 15 in which the initial phases of multiple spiral waves are supposed are prepared, it will become possible to control the initial phase of the spiral wave without mechanically rotating the zone plate.

The changes of the spiral pattern shown in FIGS. 15 (a), (b), and (c) correspond to cases where values of the parameter $\Phi_m$, expressing the initial phase of the spiral wave are zero, $2\pi/3$, and $4\pi/3$ among the patterns of the interference fringe expressed by Formula 12 and Formula 14, respectively.

Fourth Embodiment

Figure 16:
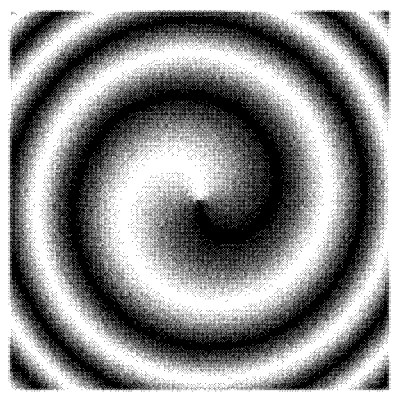
FIG. 16 illustrates pattern examples of spiral zone plates when (a) a spiral center and the center of the zone plate coincide, (b) the spiral center is shifted from the center of the zone plate to be located on the left side in the field of view, and (c) the spiral center is shifted from the center of the zone plate to be located on the left side outside the field of view.
Figure 16:
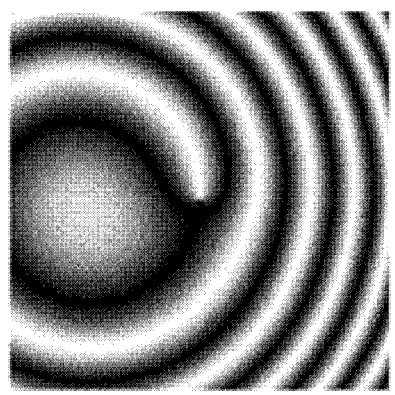
Figure 16:
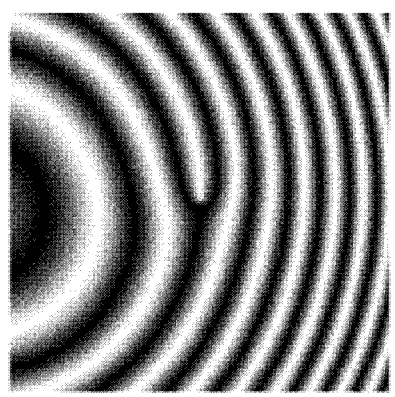

FIG. 16 shows an interference fringe when a relative angle of the propagation direction of the spherical wave that defines the pattern of the zone plate and the plane wave is changed. FIG. 16 (a) shows an interference fringe when the both propagations of the spherical wave and the plane wave are in the optical axis direction and the relative angle is zero. All the zone plates explained so far are ones when the relative angles are zeros. Differences between FIGS. 13, 14, and 15 exist in the focal length f of the zone plate.

Since FIG. 16 has a larger focal length than those of the zone plates of FIGS. 13, 14, and 15, the number of zones in the field of view has decreased. FIG. 16 (b) shows the pattern of the zone plate in the case where the spiral center is located in the middle between the center of the zone plate and a frame of the field of view, and FIG. 16 (c) shows the pattern of the zone plate in the case where the spiral center is exactly located in the frame of the field of view of the zone plate. In FIGS. 16 (a) to (c), and the axis of the spiral wave is fixed in the center of the zone plate, and the spiral degree are all −1. That is, a direction in which the spiral winds is counterclockwise and these figures illustrate cases contrary to those of FIGS. 13, 14, and 15.

In FIG. 16 (c), since a range of the field of view is relatively small as compared with the pattern, the spiral has becomes a diffraction grating comprised of curves rather than the spiral. However, it can be known easily that the centers of curvatures are in the frame of the field of view of the zone plate. In order to control a position at which the spiral wave is intended to be generated and the propagation direction of the spiral wave, the spiral must be the pattern as shown in FIG. 16.

Changes of the spiral pattern shown in FIGS. 16 (a), (b), and (c) correspond to cases where the angle of the propagation direction between the spherical wave and the plane wave is controlled in the pattern of the interference fringe expressed by Formula 11 and Formula 14. It turns out that when the relative angle of the spherical wave and the plane wave becomes large, the pattern becomes a pattern such that the spiral center is shifted from the center of the zone plate and the spiral axis is at as position of the edge dislocation of the diffraction grating, not at the spiral center.

Fifth Embodiment

Figure 17:
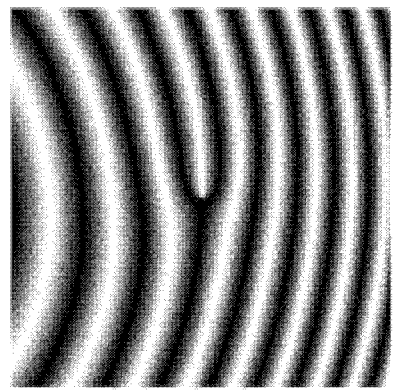
FIG. 17 illustrates pattern examples of the spiral zone plate when the spiral is made to be a diffraction grating when (a) a radius of the spiral is made larger than FIGS. 16 (c), (b) the radius of the spiral is made larger than FIGS. 17 (a), and (c) the radius of the spiral is made infinite.
Figure 17:
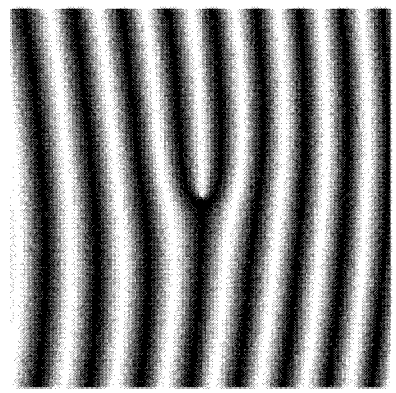
Figure 17:
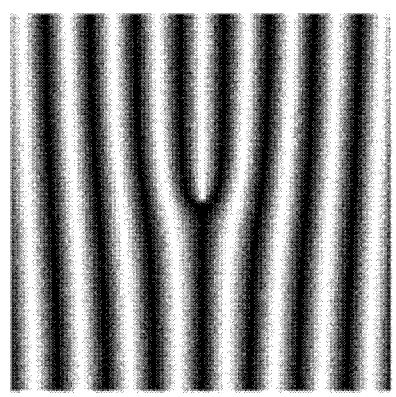

FIG. 17 shows a change of the pattern when the focal length of the zone plate is increase while the relative angle of the propagation directions of the spherical wave that defines the pattern of the zone plate and the plane wave is fixed constant. That is, this corresponds to an interference fringe recorded when the light source of the spherical wave is set away with a relative angle of the spherical wave of FIG. 16 (c) and the plane wave preserved. The spiral center is located on the left side on the figure of each pattern, and since the curvature of the pattern becomes small (radius of curvature becomes large) with an increase of the focal distance of the zone plate, an aspect of the diffraction grating is stronger as compared with FIG. 16.

Especially, FIG. 17 (c) is a case where the light source of the spherical wave is set at the infinite distance, corresponding to an interference fringe of plane waves with a relative angle to each other. That is, it is a forked diffraction grating shown in Nonpatent Literature 3. Thus, FIG. 16 and FIG. 17 are showing that the formula of the zone plate pattern by this application can deal with the spherical wave to the plane wave comprehensively.

In FIG. 16 and FIG. 17, the zone plates are set up consistently so that a spiral wave of degree 1 is generated in the center of the zone plate center of diagram). Therefore, throughout six diagrams in FIG. 16 and FIG. 17, the end part of a discontinuous fringe is located in the center of the figure and the center of the figure becomes a position of the edge dislocation of the diffraction grating. This is understood more clearly by a fact that the center of the figure becomes a root of the forked diffraction grating in FIG. 17 (c).

The change of the spiral pattern shown in FIG. 17 corresponds to a case where in Formula 9 and Formula 14, the distance f of the light source of the spherical wave and the observation plane, i.e., the focal length f of the zone plate is made to increase. A case where f is set to f=∞ is FIG. 17 (c), and it turns out that Formula 14 can also deal with the conventional diffraction grating by interference of plane waves as a limit. Formula 14 has a sufficiently wide application range that is served to practical applications as a formula expressing the pattern of the zone plate.

Sixth Embodiment

Figure 18:
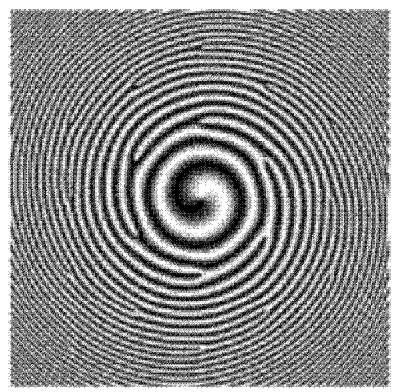
FIG. 18 illustrates pattern examples when (a) spiral waves of degree 1 are generated in a grating shape, (b) the center of a spiral is located on the left side in the field of view and the spiral waves of degree 1 are generated in a lattice-like manner, and (c) positive and negative spiral waves whose degrees are different to each another are generated in a lattice-like manner.
Figure 18:
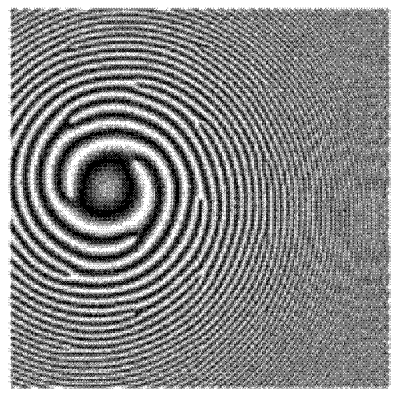
Figure 18:
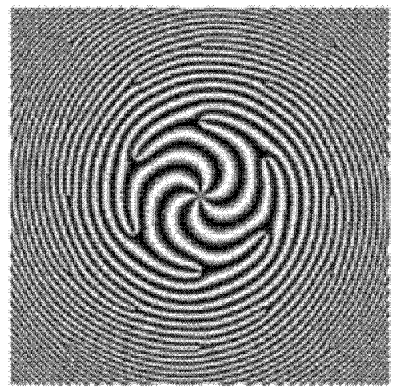

FIG. 18 illustrates a pattern of the zone plate for generating a spiral wave having multiple axes.

FIG. 18 (a) is a pattern of a spiral zone plate in which one edge dislocation is disposed in the center of the field of view and 22 edge dislocations in the entire field of view are arranged in a triangular grating manner so as to be consistent with the edge dislocation. This is a pattern such that total 23 edge dislocations form a single spiral with the center of the zone plate placed in the spiral center. The edge dislocation in the central part is similar with a pattern of FIG. 13 (a) and edge dislocations other than it are similar with a pattern of FIG. 17 (a).

That is, it turns out that the spiral waves of degree 1 are generated, respectively, with a position of each edge dislocation serving as the spiral axis. Moreover, in FIG. 18, the focal length is shorter than that of the zone plate so far obtained, and a curvature of the zone in the central part becomes larger. Although this will be the same, it may be considered that the magnification of display is made small to illustrate a larger field of view.

FIG. 18 (b) is a pattern when a relative angle is given to the propagation directions of the spherical wave and the plane wave that form the pattern of the zone plate under the same condition as that of FIG. 18 (a). Like FIG. 16 (b), this shows a pattern in the case of the relative angle as much a degree as a case where the spiral center is located on the left side in the field of view. Although it looks complex at a glance, a respect that each edge dislocation is formed centering on one spiral is the same as FIG. 18 (a).

In FIG. 18 (c), similarly with FIG. 18 (a), although the relative angle of the spherical wave and the plane wave is zero, it is different in the degree of the spiral wave generated at a position of each edge dislocation. This case is, for example, a pattern of a case where the following spiral waves are generated: in the edge dislocation at the center of the zone plate, a −sixth order spiral wave; in six edge dislocations close to and around the center, +secondary spiral waves; in 12 edge dislocations at an outer circumferential part of them, +primary spiral waves; and in four edge dislocations at a further outer circumferential part of them (i.e., four corners of the field of view), −third order spiral waves.

That is, in the configuration of the patterns in this application, it is possible to generate spiral waves of an arbitrary order including positive and negative at arbitrary positions.

The changes of the pattern shown in FIG. 18 show that position coordinates $(x_m, y_n)$ of the spiral and a value of the parameter nhm showing each spiral degree are dealt with arbitrarily and independently including plus and minus signs among the patterns of the interference fringe expressed by Formula 12 and Formula 14. It turns out that Formula 14 has a sufficiently wide application range as a formula that expresses the patterns of the zone plate.

Seventh Embodiment

Figure 19:
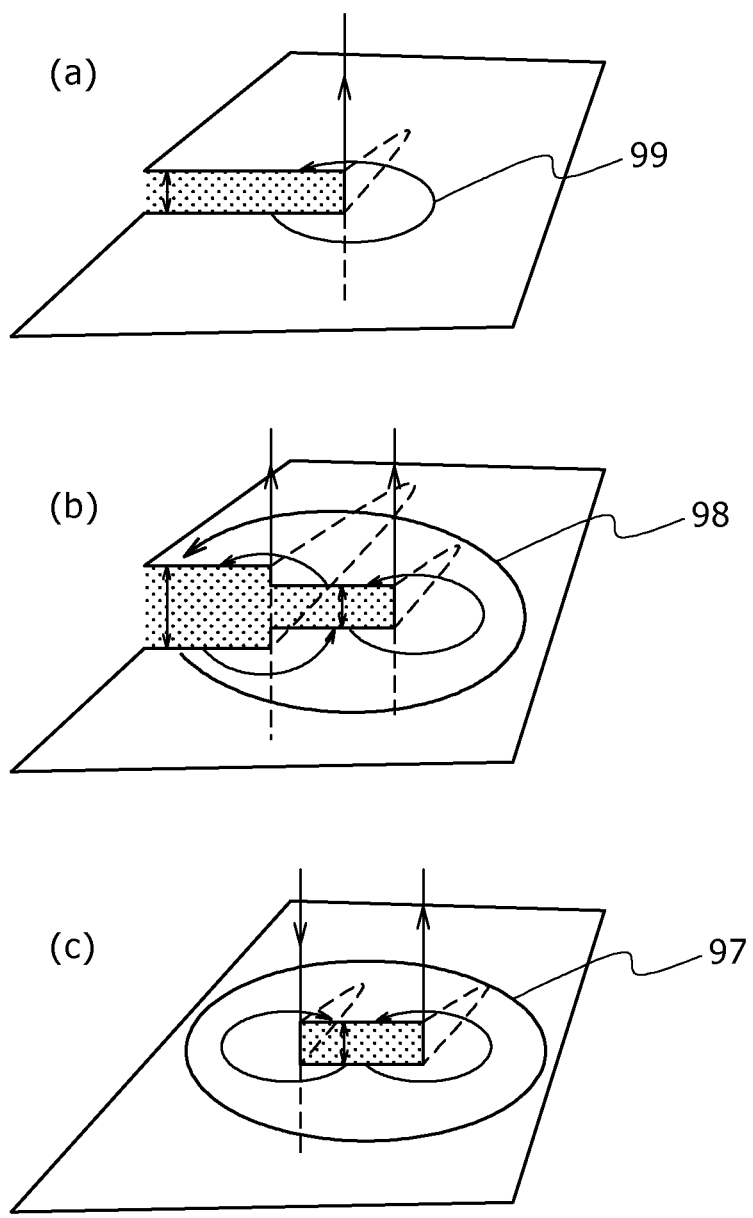
FIG. 19 illustrates schematic diagrams for explaining that the spiral states that have positive and negative degrees cancel out each other.

FIG. 19 is a schematic diagram for explaining that if the spiral states are cancelled out by combining plus and minus signs of the spiral degree, not the spiral wave but the normal plane wave (or including the spherical wave) will be generated outside an area where the edge dislocation exists on the zone plate.

FIG. 19 (a) is a schematic diagram where the plane wave and a spiral state of degree 1 are combined, and is the same as FIG. 3 and FIG. 9. When the curve 99 is made to go around so as to surround the spiral axis, it turns out that the curve 99 draws the primary spiral without connection, and the plane forms a helicoid.

FIG. 19 (b) is a diagram showing a state where two spirals of degree 1 are added in different spatial positions. Since a helicoid occurs with each spiral axis, it turns out that when a curve 98 is made to go around so as to surround two spiral axes, the curve 98 draws the secondary spiral.

FIG. 19 (c) is a diagram showing a state where positive and negative spirals of degree 1 are added in different spaces. The diagram shows that the positive and negative spiral states are mutually cancelled out, and when a curve 97 is made to go around so as to surround the both spiral axes, it becomes a closed curve 97. That is, in an area sufficiently distant from the both spiral axes that are in a cancellation relationship (for example, in an outer area of the closed curve 97), it turns out that the spiral becomes the plane wave.

Figure 20:
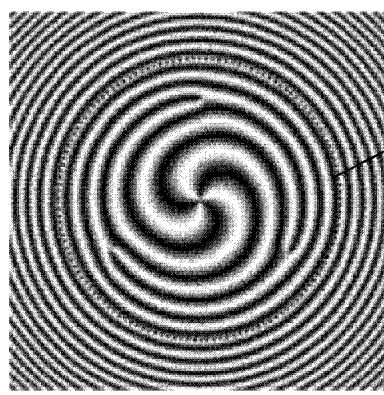
FIG. 20 illustrates pattern examples each of which generates a spiral wave in which the spiral states are cancelled out in (a) third order ×1 and −first order ×3 patterns, and (b) −sixth order ×1 and first order ×6 patterns, respectively.
Figure 20:
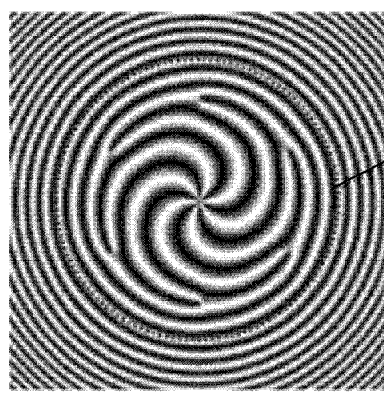

FIG. 20 shows what draws the above relationship as a pattern of the zone plate. FIG. 20 (a) is a pattern example in which an edge dislocation that generates a spiral wave of degree +3 is disposed in the center of the zone plate and edge dislocations that generate three spiral wave of degree −1 are arranged in its surroundings. It turns out that a zone outside the edge dislocation (i.e., a zone shown by a dashed line 95) forms a closed annulus, not the spiral wave but the plane wave or the spherical wave is generated in its outside area.

FIG. 20 (b) is a pattern example in which an edge dislocation that generates a spiral wave of degree −6 is disposed in the center of the zone plate and edge dislocations that generate six spiral waves of degree +1 are arranged in its surroundings. It turns out that like FIG. 20 (a), in the area outside the edge dislocation, the zone (for example, a zone shown with a dashed line 95) forms a closed annulus, and in the outside area, not the spiral wave but the plane wave or the spherical wave is generated.

Thus, the diagram shows that if the spiral states are cancelled out by combining the positive and negative orders, a state of a wave front without the spiral can be obtained in the area outside the spiral axes used for the combination. That is, according to this application, it turns out that not only control of the spiral state but also control of existence of the spiral state and its position are possible.

Eighth Embodiment

As was explained in a theoretical background of the zone plate and the second embodiment, there is known a technique whereby a blocking portion of the wave is not blocked but the brightness of an image is increased using an effect of interference. It is a method whereby the incident wave is transmitted through the zone plate not by only blocking the annular zone of a black colored portion shown in FIGS. 2 (b), (c), but by shifting its phase by π (half wavelength). This means that a phase body that is transparent and has a refractive index different from that of the transmission part and a predetermined thickness is placed in the wave-blocking section, and the phase modulation corresponds to a condition that a difference between a product of the refractive index and the thickness of the blocking part (i.e., optical path length) and a product of the refractive index and a thickness of the wave transmission part (optical path length) is set to an odd multiple of the half wavelength.

In this zone plate, the intensity of the transmitted wave (zeroth-order diffracted wave) with a largest intensity becomes zero as a result of interference between adjacent annular zones, and the principal focus (±first-order diffracted waves) will have a maximum intensity. Table 1 shows degrees of concentration of intensities (degrees of light convergence) to respective foci with a binarized zone plate (however, the high-order diffracted waves of third or more order are omitted).

TABLE 1

Situation of intensity modulation of each diffracted wave

| Diffraction order | Intensity | |
|---|---|---|
| | Case of only binarization (transmission and blocking) | Case when light is transmitted through blocking section giving modulation of phase π |
| 0 | 25% | 0 |
| +1 | 10.1% | 40.5% |
| ±2 | 1.12% | 4.5% |

That is, it turns out that by changing the phase of the transmitted wave of each annular zone by π, an about fourfold increase of the intensity of the principal focus is expected theoretically. More than it, since the brightness of a background decreases (intensity of the zeroth-order diffracted wave disappears), the effect to the contrast of the image is large. Finding the material that gives modulation only on the phase without affecting the amplitude to the wave that is used (namely, if limiting the material only in the transmissivity with respect to the amplitude, making the material transparent over the entire plate) becomes a very tough problem actually.

In the electron ray, as means configured to give the above-mentioned phase modulation, one that uses an electromagnetic field can also be used. Although this purpose is the same as that of the phase plate, in the zone plate with a structure more complicated than that of the phase plate, it is thought that use of the electromagnetic field by an artificial structure is not easy.

Accordingly, since in the electron wave, the average inner potential of a substance corresponds to the refractive index in the light wave, the average inner potential and the thickness of the material used for the blocking section will be examined. For example, modulating the phase of the electron ray by π is realized by transmitting the electron ray through a thin film of thickness t that is of the material having the average internal potential $V_{mean}$ that fulfils the relationship of Formula 17 in a black-colored area of the zone plate shown in FIG. 14. Here, V0 is the acceleration voltage of the electron ray, and the average inner potential $V_{mean}$ has a value intrinsic to the material, which means that as the acceleration voltage increases, the film thickness must be enlarged accordingly. Incidentally, a unit of Formula 18 is ($Cs^2$ $kg^{-1}$ $m^{-2}$).

$$V_{mean}t = \frac{1+AV_0}{1+2AV_0}\lambda V_0 \qquad \text{[Formula 17]}$$

However, A is given as follows.

$$A = \frac{e}{2m_0c^2} = 0.978\times 10^{-6} \qquad \text{[Formula 18]}$$

In order to enlarge the intensity of diffracted electron ray, it is intended to give modulation only to the phase while giving attenuation as less as possible to the amplitude of the electron ray passing through the area. Therefore, it becomes important to select a quality of material of which the zone plate is comprised. Table 2 summarizes an average inner potential of a typical material often used in the electron ray apparatus and a film thickness that gives a phase difference $\pi$ when an acceleration voltage is 300 kV. Since the phase difference to the electron wave should just be an odd multiple of $\pi$, a phase difference of $3\pi$, a phase difference of $5\pi$, etc. correspond to a predetermined phase difference. However, since attenuation of the amplitude increases remarkably with increase of the film thickness, only the thick film which gives the phase difference of $\pi$ is described.

TABLE 2

Average internal potential of representative material and thickness when giving phase difference $\pi$ to 300-kV electron wave

| Material | Average internal potential (V) | Thickness (mm) |
| --- | --- | --- |
| C | 7.8 | 61.4 |
| Al | 12.4 | 38.6 |
| Si | 11.9 | 40.3 |
| Cu | 23.5 | 20.4 |
| Au | 21.5 | 22.3 |
| MgO | 13.5 | 35.5 |
| SiO$_2$ (amorph.) | 10.1 | 47.4 |

Ninth Embodiment

Figure 21:
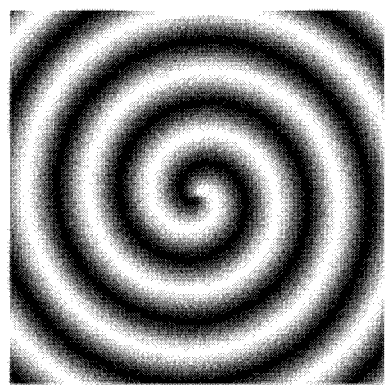
FIG. 21 illustrates pattern examples of a spiral axicon lens type zone plate when (a) a spiral degree is 1, (b) the spiral degree is two, and (c) the spiral degree is three.
Figure 21:
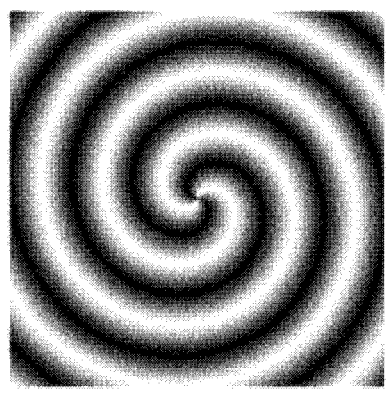
Figure 21:
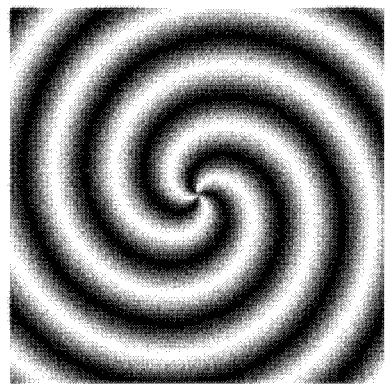

FIG. 21 shows a pattern of the zone plate for generating the conical surface wave including the spiral state. It has the spiral pattern in which the edge dislocation is woven into the zone plate that acts as the axicon lens shown in FIG. 7. Since it is set so that an axis of the spiral wave may be generated in the center of each zone plate, the discontinuous point of the grating is located in the center of the zone plate, and as a result of this, the spiral center and the center of the zone palate coincide with each other. FIG. 21 (c), FIG. 21 (b), and FIG. 21 (c) show a case of the spiral degree that is 1, a case of the spiral degree that is two, and a case of the spiral degree that is three, respectively.

The spiral patterns shown in FIG. 21 correspond to cases where values of the parameter nhm representing a degree of spiral are 1, 2, and 3, respectively, among patterns of interference fringes expressed by Formula 10 and Formula 16.

The composition of the pattern is the same as that of FIG. 13 only with the spherical wave replaced by the conical surface wave. However, unlike the case of the spherical wave of FIG. 13, the width of the zone of the pattern does not depend on the distance from the center of the zone plate, but depends on the point angle of the wave front of a conical shape (proportionality coefficient kc in Formula 16) (refer to FIG. 7). Like the pattern of FIG. 7, in the pattern of FIG. 21, a concentric pattern changed to a spiral, and there is no change in the performance of acting as the axicon lens in any way. That is, the spiral zone plate shown in FIG. 21 is obtained by adding only a new function of generating a spiral wave to the zone plate shown in FIG. 7.

Incidentally, various effects with the pattern of the zone plate as results of interference of the spherical wave and the plane wave that have been described in the first to eighth embodiments—such as an advantage regarding rigidity, a mode of variation of the pattern caused by a variation of the relative angle in the propagation direction of the conical surface wave and the plane wave, a respect that the pattern becomes similar to the pattern between the plane waves as the point angle becomes larger, a relationship between spatial arrangement of the spiral axis and its order, and cancellation of the spiral degree and its effect when the pattern is binarized—can be reflected, as they are, on a pattern of the zone plate resulting from interference of the conical surface wave and the plane wave. Since these arguments will be clear if Formula 14 expressing the pattern with the spherical wave and Formula 16 expressing the pattern with the conical surface wave are compared and referred to, further explanation is omitted.

LIST OF REFERENCE SIGNS

2 . . . Optical axis,
5 . . . Screen,
71 . . . Fulcrum of blocking section at the time of spiral degree 1,
72, 73 . . . Fulcrums of blocking section at the time of spiral degree 2,
74, 75, 76 . . . Fulcrums of blocking section at the time of spiral degree 3,
79 . . . Connection point of blocking section at the spiral center,
87 . . . Wave front of conic wave-like spiral wave,
88 . . . Wave front of plane wave-like spiral wave,
89 . . . Wave front of spherical wave-like spiral wave,
95 . . . Dashed line showing one example of zone describing circle,
97 . . . Line surrounding two spiral axes that cancel out each other
98 . . . Line surrounding two spiral axes
99 . . . Line surrounding spiral axe

The invention claimed is:

1. A zone plate configured to generate a spiral charged particle beam in a convergence state or a divergence state, wherein, in zones that form an annular zone grating of the zone plate, at least a part thereof has a discontinuity that is discontinuous with respect to the annular zone grating, and wherein the discontinuity forms a Y-shaped branching edge dislocation in the grating that the zones form.

2. The zone plate according to claim 1, wherein the zones having the discontinuity form a spiral shape that has the discontinuity as its end part and has a center of an annulus of the annular zone grating as a spiral center.

3. The zone plate according to claim 1, wherein an amplitude transmissivity of a blocking section of the charged particle beam in the zone plate modulates a phase of the charged particle beam by an odd multiple of $+\pi$ or an odd multiple of $-\pi$.

4. A zone plate configured to generate a spiral charged particle beam in a convergence state or a divergence state using a diffraction phenomenon, wherein the zone plate forms a spiral shape that is defined by a combination of an annular zone grating and a diffraction grating having a discontinuity that is discontinuous with respect to the annular zone grating, and wherein the discontinuity forms a Y-shaped branching edge dislocation.

5. The zone plate according to claim 4, wherein the spiral shape has an end part that forms the edge dislocation and the end part is an end part of start or end in the spiral shape.

6. The zone plate according to claim 4, wherein the spiral shape is such that when an azimuth angle seeing from a center of the spiral is increased or decreased, a distance between the spiral center and the grating varies continuously.

7. The zone plate according to claim 4, wherein an amplitude transmissivity of a blocking section of the charged particle beam in the zone plate modulates a phase of the charged particle beam by an odd multiple of $+\pi$ or an odd multiple of $-\pi$.

* * * * *